(No Model.)

D. BROOKS.
INSULATING UNDERGROUND ELECTRIC CONDUCTORS.

No. 356,981. Patented Feb. 1, 1887.

WITNESSES:
David S. Williams.
William D. Conner.

INVENTOR:
David Brooks
by his Attorneys,
Howson & Sons

UNITED STATES PATENT OFFICE.

DAVID BROOKS, OF PHILADELPHIA, PENNSYLVANIA.

INSULATING UNDERGROUND ELECTRIC CONDUCTORS.

SPECIFICATION forming part of Letters Patent No. 356,981, dated February 1, 1887.

Application filed July 19, 1886. Serial No. 203,392. (No model.)

*To all whom it may concern:*

Be it known that I, DAVID BROOKS, a citizen of the United States, residing in Philadelphia, Pennsylvania, have invented certain Improvements in Insulating Underground Electric Conductors, of which the following is a specification.

The object of my invention is to provide a practicable plan of using, for the purpose of insulating electrical conductors laid in underground tubes or conduits, insulating material which is normally of a solid or semi-solid character, and must be heated to render it liquid.

In patents heretofore granted to me, numbered 165,535, 199,506, and 280,986, and in my British Patent No. 4,824 of 1877, I have described the use, as a means of insulating electrical conductors laid in underground tubes or conduits, of oil or other liquid insulating material maintained under pressure in said tubes or conduits.

My present invention is intended for adoption in cases where the use of oil or other liquid insulating material under pressure in the pipes or conduits is not available, the insulating material used by me in the present case being paraffine, ozocerite, asphaltum, rosin, or other equivalent insulating material which is normally of a solid or semi-solid character, and must be heated in order to render it liquid.

Underground pipes for containing electrical conductors are usually provided with splice-boxes at intervals of several hundred feet, a length of cable or other conductor being drawn through the pipe or conduit from one splice-box to another, and the ends of adjoining lengths of cable being properly connected before closing the splice-box. When an attempt is made to use, for the purpose of insulating the conductors, a material other than that which is normally of liquid character, it is a matter of difficulty, if not impossibility, to properly fill with the insulating material the length of pipe or conduit between two splice-boxes, the insulating material becoming solid and refusing to flow before it has traversed the length of pipe. I overcome this objection in the manner which I will now proceed to describe, reference being had to the accompanying drawings, in which—

Figure 2:
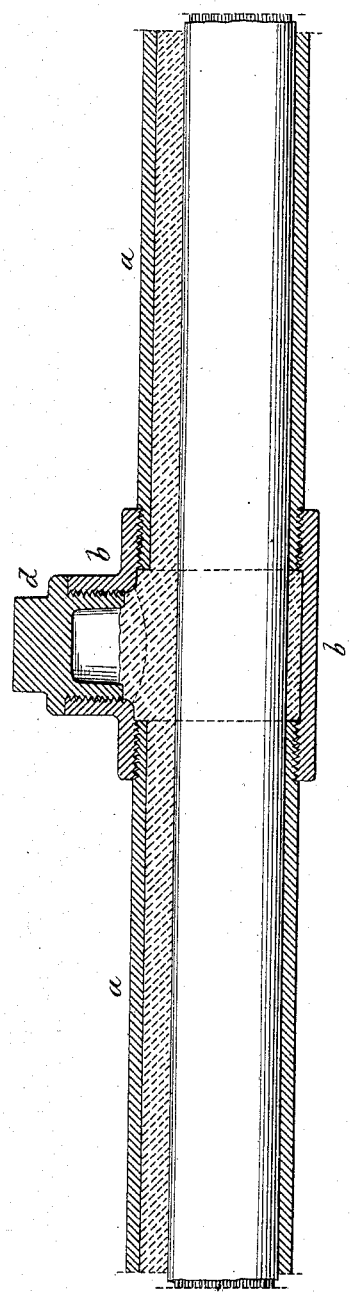
Figure 1:
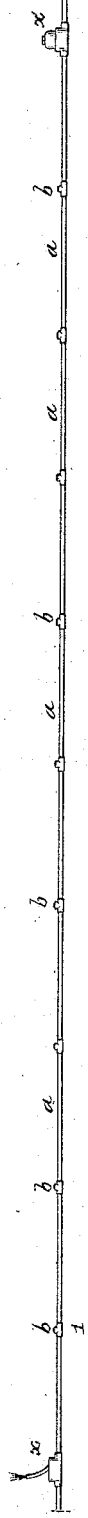
Figure 3:
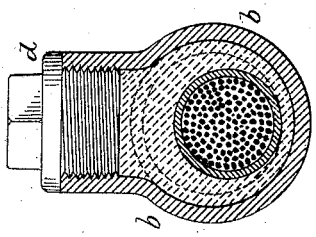

Figure 1 is a diagram illustrating a portion of an underground telegraph-line constructed for carrying out my invention; Fig. 2, a longitudinal section on an enlarged scale of part of the line; and Fig. 3, a transverse section on the line 1 2, Fig. 2.

Each section of the line between the splice-boxes $x$ is composed of a number of pipes, $a$, in lengths of, say, twenty or twenty-five feet, and these pipes are connected by means of T-couplings $b$, one joint of the T-coupling being placed vertically, and being provided with a suitable closing-plug, $d$. After a cable of conductors has been drawn through a section of the line from one splice-box to another, I remove the plugs from the T-couplings connecting the different lengths of pipe, and into that coupling which occupies the lowest position on the section of line I pour the insulating material, which has been previously heated to reduce it to a liquid condition. For instance, in the line shown in the diagram, Fig. 1, I should commence to fill the pipe at the coupling $l$, the air escaping from one or more of the other couplings on the line as the filling is proceeded with. As soon as the lowest portion of the line has been filled with insulating material I proceed to a higher coupling and pour insulating material into the same, this operation being repeated in succession at higher and higher points, until all portions of the section of conduit between the splice-boxes have been filled with insulating material, the plugs being applied to the T-couplings after the pouring of the insulating material into the same has been completed. By thus introducing the insulating material at a number of points on the line each section to be filled is so short that the material will not harden and obstruct the flow before it reaches the end of said section. The conductors are thus thoroughly insulated from one splice-box to another.

If desired, the pipe at and near the coupling through which the insulating material is being poured may be heated in order to insure a freer flow of said insulating material through the pipe, and in order to facilitate the escape of air from the pipe the coupling in advance of that through which the insulating material is being poured may be propped up, so as to occupy a higher level, as will be readily understood.

I claim as my invention—

1. The mode herein described of applying to electrical conductors contained in a pipe or conduit insulating material which is normally of a solid or semi-solid character, said mode consisting in first drawing the conductors into a continuous length of the pipe and then pouring the melted insulating material into the pipe at a number of points, successively, along said length, whereby the conduit is filled by sections with insulating material throughout its length, all substantially as specified.

2. The mode herein described of applying to electrical conductors contained in a conduit insulating material which is normally of a solid or semi-solid character, said mode consisting in first drawing the conductors into a length of the line and then introducing the melted insulating material into said length of line at a number of points, successively, commencing at the lowest level, the air escaping from the conduit at the higher levels as successive sections of the conduit are filled with insulating material, all substantially as specified.

In testimony whereof I have signed my name to this specification in the presence of two subscribing witnesses.

DAVID BROOKS.

Witnesses:
JOHN E. PARKER,
ARCHER MCLEAN.